United States Patent
Noh et al.

(10) Patent No.: US 12,209,173 B2
(45) Date of Patent: Jan. 28, 2025

(54) PELLET-TYPE POLYPROPYLENE RESIN COMPOSITION AND METHOD FOR PREPARING THE SAME

(71) Applicant: LG Chem, Ltd., Seoul (KR)

(72) Inventors: Kyung Seop Noh, Daejeon (KR); Heekwang Park, Daejeon (KR); Seong Min Chae, Daejeon (KR); Jihwa Ye, Daejeon (KR)

(73) Assignee: LG Chem, Ltd., Seoul (KR)

( * ) Notice: Subject to any disclaimer, the term of this patent is extended or adjusted under 35 U.S.C. 154(b) by 792 days.

(21) Appl. No.: 17/290,881

(22) PCT Filed: Sep. 25, 2020

(86) PCT No.: PCT/KR2020/013050
§ 371 (c)(1),
(2) Date: May 3, 2021

(87) PCT Pub. No.: WO2021/066398
PCT Pub. Date: Apr. 8, 2021

(65) Prior Publication Data
US 2021/0388178 A1    Dec. 16, 2021

(30) Foreign Application Priority Data

Sep. 30, 2019   (KR) .................. 10-2019-0121173
Sep. 24, 2020   (KR) .................. 10-2020-0123879

(51) Int. Cl.
*C08K 5/3492*    (2006.01)
*B29B 11/10*     (2006.01)
(Continued)

(52) U.S. Cl.
CPC ............ *C08K 5/3492* (2013.01); *B29B 11/10* (2013.01); *C08F 4/65927* (2013.01);
(Continued)

(58) Field of Classification Search
CPC ...... C08K 5/3492; C08K 5/098; C08K 5/105; C08K 5/12; C08F 4/65927; C08F 110/06; B29B 11/10; D01F 1/02; D01F 6/06
See application file for complete search history.

(56) References Cited

U.S. PATENT DOCUMENTS 5,637,666 A   6/1997   Winter et al.
5,868,984 A   2/1999   Winter et al.
(Continued)

FOREIGN PATENT DOCUMENTS

CN   110099934 A   8/2019
EP   3733724 A1   11/2020
(Continued)

OTHER PUBLICATIONS

International Search Report for Application No. PCT/KR2020/013050 mailed Jan. 4, 2021, pp. 1-4.
(Continued)

*Primary Examiner* — John E Uselding
(74) *Attorney, Agent, or Firm* — Lerner David LLP

(57) ABSTRACT

There are provided a pellet type polypropylene resin composition that exhibits excellent heat resistance and oxidation stability, and exhibits high flow without using a decomposition accelerator, and thus, can be used to prepare fine denier fiber, and a method for preparing the same.

18 Claims, 2 Drawing Sheets

(51) Int. Cl.
  *C08F 4/6592* (2006.01)
  *C08F 110/06* (2006.01)
  *C08K 5/098* (2006.01)
  *C08K 5/105* (2006.01)
  *C08K 5/12* (2006.01)
  *D01F 1/02* (2006.01)
  *D01F 6/06* (2006.01)

(52) U.S. Cl.
  CPC ............ *C08F 110/06* (2013.01); *C08K 5/098* (2013.01); *C08K 5/105* (2013.01); *C08K 5/12* (2013.01); *D01F 1/02* (2013.01); *D01F 6/06* (2013.01)

(56) References Cited

U.S. PATENT DOCUMENTS

| | | | |
|---|---|---|---|
| 6,503,993 | B1 | 1/2003 | Huovinen et al. |
| 2003/0083437 | A1 | 5/2003 | Bugada et al. |
| 2006/0116490 | A1* | 6/2006 | Paczkowski .......... C08F 210/06 502/103 |
| 2009/0017710 | A1 | 1/2009 | Bugada et al. |
| 2016/0075860 | A1 | 3/2016 | Vansoeybroeck |
| 2017/0282410 | A1 | 10/2017 | Mcleod et al. |
| 2020/0031962 | A1 | 1/2020 | Kim et al. |
| 2020/0140583 | A1 | 5/2020 | Kim et al. |

FOREIGN PATENT DOCUMENTS

| | | |
|---|---|---|
| JP | H06015646 B2 | 3/1994 |
| JP | H06239934 A | 8/1994 |
| JP | H09268242 A | 10/1997 |
| JP | 2000256953 A | 9/2000 |
| JP | 2007145914 A | 6/2007 |
| KR | 100582702 B1 | 5/2006 |
| KR | 100769842 B1 | 10/2007 |
| KR | 20080098637 A | 11/2008 |
| KR | 101062997 B1 | 9/2011 |
| KR | 20160031459 A | 3/2016 |
| KR | 20170050427 A | 5/2017 |
| KR | 20190078393 A | 7/2019 |
| WO | 2017172477 A1 | 10/2017 |
| WO | 2019132421 A1 | 7/2019 |
| WO | 2021112623 A1 | 6/2021 |

OTHER PUBLICATIONS

Extended European Search Report for corresponding EP Application 20872959.0 dated Dec. 16, 2021, 2 pgs.

* cited by examiner

[Fig. 1]
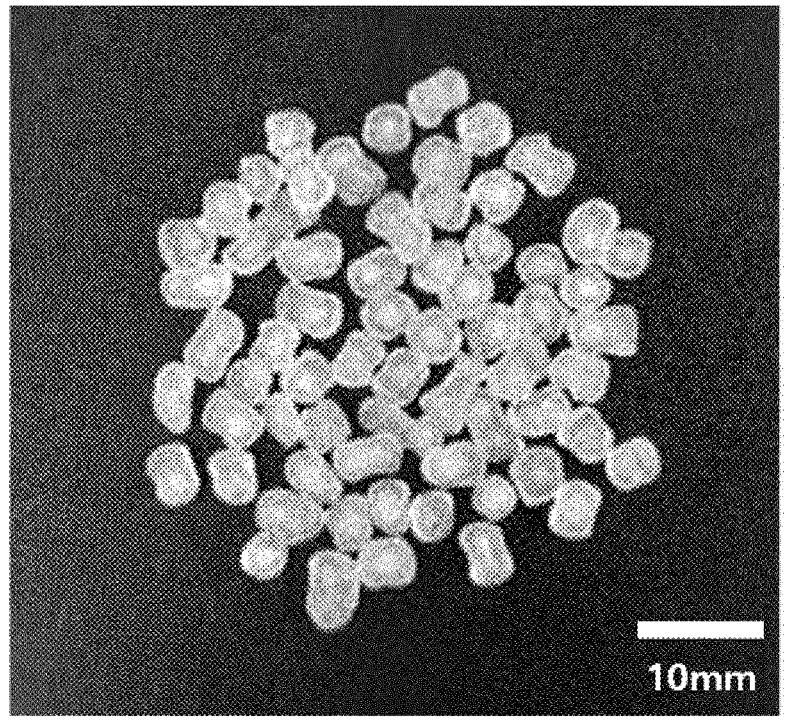
[Fig. 2]
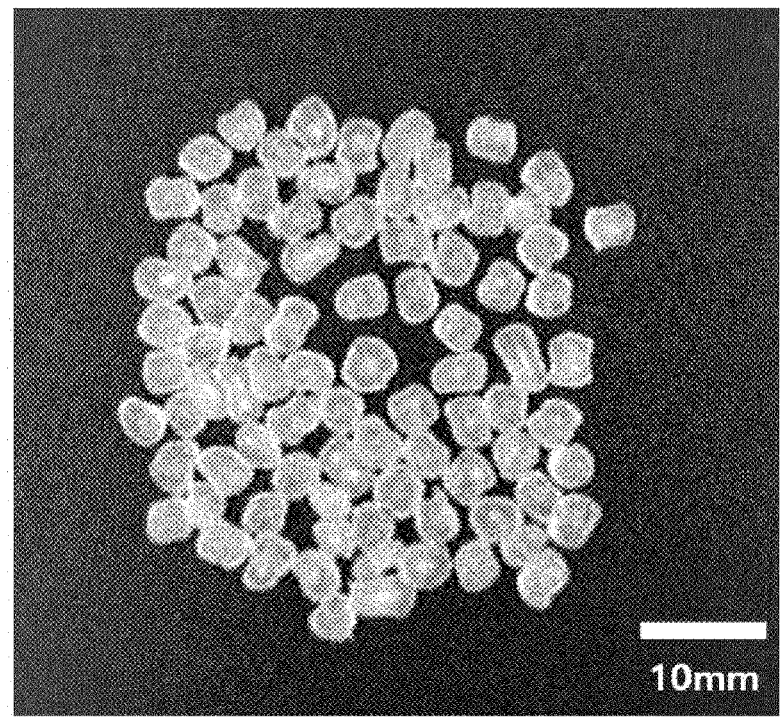

[Fig. 3]
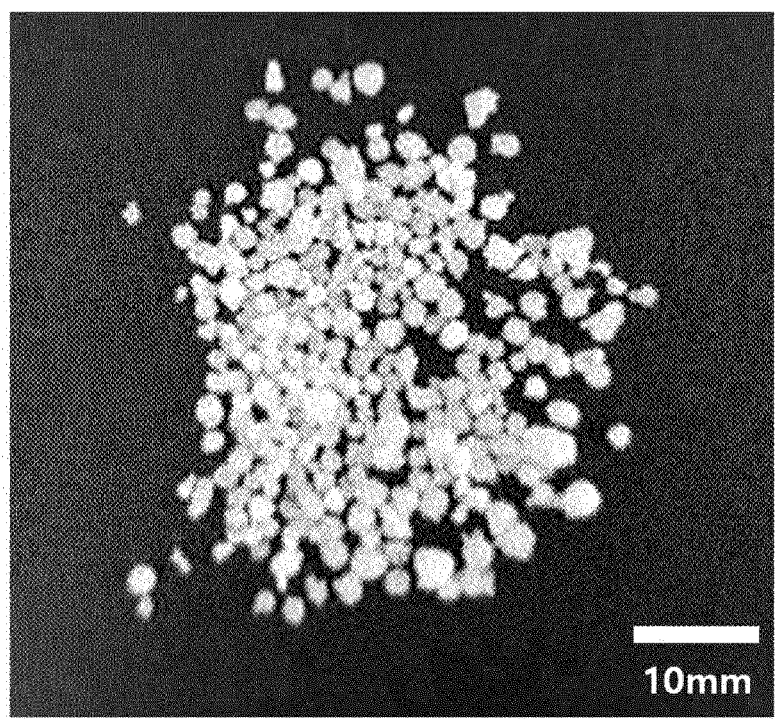

PELLET-TYPE POLYPROPYLENE RESIN COMPOSITION AND METHOD FOR PREPARING THE SAME

CROSS-REFERENCE TO RELATED APPLICATION(S)

This present application is a national phase entry under 35 U.S.C. § 371 of International Application No. PCT/KR2020/013050 filed Sep. 25, 2020, which claims priority from Korean Patent Application No. 10-2019-0121173 filed Sep. 30, 2019, and Korean Patent Application No. 10-2020-0123879 filed Sep. 24, 2020, all of which are incorporated herein by reference in their entirety.

TECHNICAL FIELD

This invention relates to a pellet type polypropylene resin composition that exhibits excellent heat resistance and oxidation stability, and exhibits high flow without using a decomposition accelerator, and thus, can be used to prepare fine denier fiber, and a method for preparing the same.

BACKGROUND ART

Polypropylene is being used as common resin in various fields, due to low specific gravity, high heat resistance, and excellent processability and chemical resistance, and particularly, high flow homo polypropylene is being used for fine denier melt blown fiber.

Recently, in textile industry, there is a growing demand for fine denier pellet type material that can improve filter efficiency in a filter or mask, which is the main use of the final product, and improvement in heat resistance, weather resistance and oxidation stability of a resin composition is required.

Since common Ziegler-Natta catalyst exhibits low hydrogen reactivity, homo polypropylene prepared using the same exhibits low melt index(MI). Thus, when preparing a pellet type resin composition using the homo polypropylene, flowability is increased through visbreaking or controlled rheology(CR) process using a peroxide based decomposition accelerator during an extrusion process. However, the use of peroxide based decomposition accelerators may deteriorate heat resistance and oxidation stability. And, due to the limitation of Ziegler-Natta catalyst having multiple active sites, the homo polypropylene has wide molecular weight distribution, and thus, there is a limit to fine denier when applied for fiber.

And, although high flow polypropylene resin composition prepared using commercial metallocene catalyst is useful for preparation of fine denier fiber, it has powder shape and wide particle distribution, and it is not easy to use an antioxidant for improvement of oxidation stability.

Thus, there is a demand for development of a resin composition that not only has high flow, and thus, can be used to prepare fine denier fiber, but also has improved heat resistance and oxidation stability.

DETAILED DESCRIPTION OF THE INVENTION

Technical Problem

It is an object of the invention to provide a pellet type polypropylene resin composition that exhibits excellent heat resistance and oxidation stability, and exhibits high flow without using a decomposition accelerator, and thus, can be used to prepare fine denier fiber, and a method for preparing the same.

Technical Solution

According to one embodiment of the invention, there is provided a pellet type polypropylene resin composition comprising:
homo polypropylene having a melt index, measured under a load of 2.16 kg at 230° C. according to ASTM D1238, of 400 g/10 min or more; and
an antioxidant, and
fulfilling the following conditions a1) to a6):
a1) melt index, measured under a load of 2.16 kg at 230° C. according to ASTM D1238: 400 to 1500 g/10 min,
a2) melting temperature: 154° C. or more,
a3) recrystallization temperature: 112° C. or more,
a4) xylene solubles: 1.0 wt % or less, based on the total weight of the pellet type polypropylene resin composition,
a5) molecular weight distribution: less than 2.4, and
a6) oxidation induction time, measured under conditions of 200° C. and 50 ml/min of oxygen according to ASTM D3985: 30 minutes or more.

According to another embodiment of the invention, there is provided a method for preparing the pellet type polypropylene resin composition, comprising steps of: conducting polymerization of propylene monomers while introducing hydrogen gas, in the presence of a catalyst composition comprising a transition metal compound represented by the following Chemical Formula 1, to prepare homo polypropylene exhibiting melt index of 400 g/10 min or more, measured under load of 2.16 kg at 230° C. according to ASTM D1238; and mixing the homo polypropylene with antioxidant to prepare a mixed composition, and then, extruding and pelletizing:

[Chemical Formula 1]

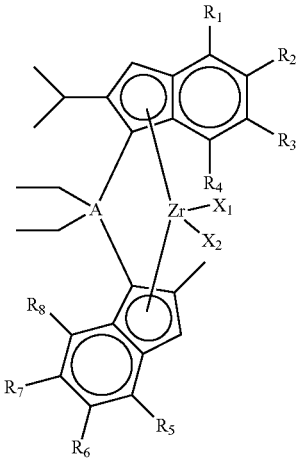

in the Chemical Formula 1,
A is carbon, silicon or germanium,
$X_1$ and $X_2$ are each independently, halogen,
$R_1$ and $R_5$ are each independently, $C_{6-20}$ aryl substituted with $C_{1-20}$ alkyl,
$R_2$ to $R_4$, and $R_6$ to $R_8$ are each independently, hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl.

According to yet another embodiment of the invention, there is provided fiber, more specifically, non woven fabric, comprising the pellet type polypropylene resin composition.

Advantageous Effects

The pellet type polypropylene resin composition according to this invention comprises high flow homo polypropylene polymerized using a metallocene catalyst having high hydrogen reactivity, and an anti-oxidant of a specific structure, thus exhibiting excellent heat resistance and oxidation stability. And, since it exhibits high flowability, it can be used to prepare fine denier fiber without using a decomposition accelerator. Thus, it is particularly useful in the field of preparation of fiber requiring excellent filter efficiency, such as a filter or a mask, and the like.

BRIEF DESCRIPTION OF THE DRAWINGS

FIGS. 1 to 3 are photographs observing the shapes of polypropylene resin compositions prepared in Example 1, Comparative Example 1 and Comparative Example 3.

DETAILED DESCRIPTION OF THE EMBODIMENTS

Terms used herein are only to explain specific embodiments, and are not intended to limit the invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to this invention and this invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, a pellet type polypropylene resin composition, a method for preparing the same, and fiber prepared using the same will be explained in detail.

In the present disclosure, by using high flow homo polypropylene that is prepared using a transition metal of the Chemical Formula 1 exhibiting high hydrogen reactivity, and an anti-oxidant having a specific structure in combination, a pellet type polypropylene resin composition with high flow can be prepared. The resin composition may exhibit excellent heat resistance and oxidation stability due to increase in melting temperature(Tm) and recrystallization temperature(Trc), and decrease in xylene solubles, and it may exhibit excellent fiber processability without visbreaking or rheology process using a decomposition accelerator, and thus, can be used to prepare fine denier fiber.

Specifically, a pellet type polypropylene resin composition according to one embodiment comprises:

homo polypropylene having melt index, measured under a load of 2.16 kg at 230° C. according to ASTM D1238, of 400 g/10 min or more; and an antioxidant, and fulfills the following conditions a1) to a6):

a1) melt index, measured under load of 2.16 kg at 230° C. according to ASTM D1238: 400 to 1500 g/10 min, a2) melting temperature: 154° C. or more, a3) recrystallization temperature: 112° C. or more, a4) xylene solubles: 1.0 wt % or less, based on the total weight of the pellet type polypropylene resin composition, a5) molecular weight distribution: less than 2.4, and a6) oxidation induction time, measured under conditions of 200° C. and 50 ml/min of oxygen according to ASTM D3985: 30 minutes or more.

As used herein, a pellet or pellet-type refers to a small particle or piece formed by extrusion of raw material, and includes all the shapes classified as a pellet in concerned technical field, such as a circle, a polygon, a rod, and the like. A pellet and powder may be classified on the basis of bulk density, and in the present disclosure, material having bulk density of 0.35 g/ml or more and 0.60 g/ml or less is defined as a pellet.

Specifically, in the pellet type polypropylene resin composition according to one embodiment of the invention, the homo polypropylene is prepared by polymerization using a transition metal compound having a specific structure as explained later, and it exhibits high melt index of 400 g/10 min or more (measured under load of 2.16 kg at 230° C. according to ASTM D1238), without using separate additive or process.

And, the homo polypropylene may further fulfill one or more, two or more, or all of the following b1) to b3) conditions:

b1) melt index, measured under a load of 2.16 kg at 230° C. according to ASTM D1238: 500 to 1500 g/10 min, b2) xylene solubles: 0.1 to 1 wt %, based on the total weight of the homopolypropylene, and b3) molecular weight distribution: less than 2.4.

Commonly, melt index of polymer can be adjusted by controlling the amount of hydrogen introduced during a polymerization process. Previously, when preparing high flow polypropylene using a Ziegler-natta catalyst, high content of hydrogen should be introduced in the polymerization step. However, in the present disclosure, by using a metallocene compound of the Chemical Formula 1, which has high hydrogen reactivity, and thus, exhibits excellent catalytic activity eve if hydrogen introduction amount is decreased, and due to steric hindrance by a substituent bonded to a ligand, specifically an isopropyl group, can prepare low molecular weight polymer, homo polypropylene prepared may exhibit high melt index. Thereby, a resin composition comprising the homo polypropylene also exhibits high flow, and thus, it may exhibit excellent fiber processability without visbreaking or rheology process using a decomposition accelerator that decreases heat resistance and oxidation stability. More specifically, the homo polypropylene exhibits melt index of 400 g/10 min or more, or 500 g/10 min or more, or 510 g/10 min or more, and 1500 g/10 min or less, or 1400 g/10 min or less, or 1300 g/10 min or less, or 1250 g/10 min or less, or 1220 g/10 min or less.

And, the homo polypropylene has low xylene solubles (X.S) of 1 wt % or less, based on the total weight of homo polypropylene, due to the characteristic preparation method.

In the present disclosure, xylene soluble is a measurement of the content(wt %) of soluble polymer, in crystallized and cooled xylene obtained by dissolving homo polypropylene in xylene and cooling, and then, crystallizing insoluble parts from the cooled solution, and it means the content of polymer chain having low tacticity. Thus, it can be seen that the lower the xylene solubles, the higher tacticity the homo polypropylene has. In the polypropylene resin composition according to one embodiment of the invention, since homo polypropylene exhibits low xylene solubles of 1 wt % or less, it has high tacticity, and thus, can increase crystallinity and recystallization temperature of a resin composition, thereby improving heat resistance and oxidation stability. The xylene solubles can be adjusted by controlling the kind of a catalyst used, polymerization conditions, and the like, and considering the excellent improvement effect of heat resistance and oxidation stability of the resin composition according to control of xylene solubles, the xylene solubles of the homo polypropylene may be more specifically 0.1 wt % or more, or 0.2 wt % or more, or 0.3 wt % or more, and 1 wt % or less, or less than 0.5 wt %, or 0.4 wt % or less.

Meanwhile, in the present disclosure, xylene solubles of homo polypropylene may be obtained by introducing xylene in a homo polypropylene sample, heating at 135° C. for 1 hour and cooling for 30 minutes to progress pre-treatment, and then, dripping xylene at a flow rate of 1 mL/min for 4 hours in OminiSec (Viscotek Corporation FIPA) apparatus, and recording and measuring the concentration and injection amount of the pretreated sample if base lines of RI (Refractive Index), DP (Differential Pressure), IP (Inlet Pressure) are stabilized, and then, calculating a peak area. Specific measurement method and measurement conditions will be explained in detail in Experimental Example.

And, the homo polypropylene exhibits narrow molecular weight distribution(MWD) of less than 2.4, due to the characteristic preparation method. As the result, it exhibits excellent fiber processability, and thus, can be used to prepare fine denier fiber. More specifically, the MWD may be less than 2.4, or 2.3 or less, and 2.0 or more, or 2.1 or more.

Meanwhile, in the present disclosure, the molecular weight distribution(MWD) of the homo polypropylene may be determined by respectively measuring weight average molecular weight(Mw) and number average molecular weight(Mn) of homo polypropylene using gel permeation chromatography(GPC), and then, calculating the ratio(Mw/Mn) of the weight average molecular weight to the number average molecular weight. Specific measurement method and measurement conditions will be explained in detail in Experimental Example.

More specifically, the homo polypropylene may fulfill the following b1') to b3') conditions:

b1') melt index, measured under load of 2.16 kg at 230° C. according to ASTM D1238: 500 g/10 min or more, or 510 g/10 min or more, and 1250 g/10 min or less, or 1220 g/10 min or less, b2') xylene solubles: 0.1 wt % or more, or 0.2 wt % or more, or 0.3 wt % or more, and less than 0.5 wt %, or 0.4 wt % or less, based on the total weight of the homo polypropylene, and b3') molecular weight distribution(MWD): less than 2.4, or 2.3 or less, and 2.0 or more, or 2.1 or more.

Meanwhile, the pellet type polypropylene resin composition according to one embodiment of the invention comprises an anti-oxidant, as well as the homo polypropylene.

In the existing power type resin composition, an antioxidant is added to polypropylene powder, and thus, it was difficult for the antioxidant to be uniformly distributed over the entire composition, and it was also difficult for the antioxidant to be distributed inside of the powder. As the result, antioxidation effect was low compared to the introduction amount. In this regard, in the present disclosure, by using an antioxidant in combination with the high flow homo polypropylene, the antioxidant may be uniformly dispersed in the resin composition, and thus, more excellent thermal decomposition prevention effect and fiber processability enhancing effect may be exhibited.

And, the antioxidant used in the pellet type polypropylene resin composition according to one embodiment of the invention comprises a phenol based compound having a long chain structure of aliphatic hydrocarbon having a carbon number of 12 or more in the molecule, or a structure of 1,3,5-triazine-2,4,6-(1H,3H,5H)-trione.

Heat, shear stress, and the like applied during the processing of polypropylene and a resin composition comprising the same induce thermal decomposition by radical mechanism to cause chain cleavage or crosslinking, thereby causing property change of the polymer and resin composition, such as viscosity decrease, and the like. In order to prevent the change, an antioxidant is introduced, and among them, a phenol based antioxidant has excellent effect of reacting with polymer radicals and peroxy radicals produced by decomposition of polymer chain to consume radicals, and particularly has excellent property of preventing thermal decomposition, compared to common antioxidants such as phosphorus based antioxidants, and the like. In addition, phenol based compounds containing substituents with large steric hindrance may exhibit more excellent antioxidation effect, due to maximization of resonance effect and electron induction effect. However, although the phenol based antioxidants have excellent color stability at the beginning, discoloration, specifically yellowing easily occurs with the elapse of time. And, some phenol based antiodixants, such as pentaerythritol tetrakis[3-[3,5-di-tert-butyl-4-hydroxyphenyl]propionate, may be discolored into pink when preparing fiber through melt blown process, and the like.

Thus, in the present disclosure, by using a phenol based antioxidant with a long chain structure of aliphatic hydrocarbon having a carbon number of 12 or more, or a phenol based antioxidant having a structure of 1,3,5-triazine-2,4,6-(1H,3H,5H)-trione, not only excellent oxidation stability improvement effect of homo polypropylene and a resin composition comprising the same may be exhibited, but also viscosity decrease and yellowing may be prevented.

As specific examples of the antioxidant, octadecyl-3-[3,5-di-tert-butyl-4-hydroxyphenyl]propionate, 1,3,5-tris(3,5-di-tert-butyl-4-hydroxybenzyl)-1,3,5-triazine-2,4,6-(1H,3H,5H)-trione, and 1,3,5-tris(4-tert-butyl-3-hydroxy-2,6-dimethyl benzyl)-1,3,5-triazine-2,4,6-(1H,3H,5H)-trione, and the like may be mentioned, and among them, one or mixtures of two or more may be used. And, commercially available Irganox® 3114(BASF Corporation), Irganox® 1076 (BASF Corporation). or Cyanox® 1790 (CYTEC Corporation), fulfilling the above structural characteristics, may be also used.

The antioxidant may be included in the content of 0.01 to 1 part by weight, based on 100 parts by weight of the homo polypropylene. If the content of the antioxidant is less than 0.01 parts by weight, improvement effect according to the use of the antioxidant may be insignificant, and if it is greater than 1 part by weight, there is a concern about viscosity decrease and discoloration due to the excessive amount of antioxidant. More specifically, the antioxidant may be included in the content of 0.05 parts by weight or more, or 0.1 parts by weight or more, and 0.5 parts by weight or less, or 0.3 parts by weight or less.

And, the pellet type polypropylene resin composition according to one embodiment of the invention may further comprise a lubricant.

The lubricant has excellent antioxidation property, and thus, when used in combination with the above described high flow homo polypropylene, it may efficiently prevent decomposition by oxygen in the air or heat, thereby further improving fiber processability. As the lubricant, organic metal based compounds, such as calcium stearate, aluminum para-tert butyl benzoate, sodium benzoate, or calcium benzoate, and the like, may be mentioned, and among them, one or mixtures of two more may be used.

The lubricant may be included in the content of 0.01 to 0.05 parts by weight or less, based on 100 parts by weight of the homo polypropylene. If the introduction amount of the lubricant is less than 0.01 parts by weight, antioxidation and fiber processability improvement effects according to the introduction of the lubricant may be insignificant, and if it is greater than 0.05 parts by weight, there is a concern about discoloration due to the excessive amount of lubricant. More specifically, the lubricant may be included in the content of 0.01 parts by weight or more, or 0.015 parts by weight or more, or 0.02 parts by weight or more, and 0.05 parts by weight or less, or 0.03 parts by weight or less, based on 100 parts by weight of the homo polypropylene.

The pellet type polypropylene resin composition according to one embodiment of the invention may further comprise one or more additives such as a neutralization agent, a slip agent, an anti-blocking agent, an UV stabilizer, an antistatic agent, and the like, beside the above described components. The content of the additives is not specifically limited, and for example, each additive may be used in the content of 500 ppm or more, or 700 ppm or more, and 2500 ppm or less, or 1500 ppm or less, based on the total weight of the homo polypropylene.

The pellet type polypropylene resin composition according to one embodiment of the invention comprises high flow homo polypropylene prepared by the above described preparation method, thereby fulfilling the following a1) to a6) conditions:

a1) melt index, measured under load of 2.16 kg at 230° C. according to ASTM D1238: 400 to 1500 g/10 min, a2) melting temperature: 154° C. or more, a3) recrystallization temperature: 112° C. or more, a4) recrystallization temperature: 1.0 wt % or less, based on the total weight of the pellet type polypropylene resin composition, a5) molecular weight distribution: less than 2.4, and a6) oxidation induction time measured under conditions of 200° C. and 50 ml/min oxygen according to ASTM D3985: 30 minutes or more.

And, the pellet type polypropylene resin composition may further fulfill one or more, or two or more, or three or more, or four or more, or all of the following a1') to a6') conditions:

a1') melt index, measured under load of 2.16 kg at 230° C. according to ASTM D1238: 500 to 1500 g/10 min, a2') melting temperature: 155 to 170° C., a3') recrystallization temperature: 120 to 130° C., a4') xylene solubles: 0.1 to 0.5 wt %, based on the total weight of the resin composition, a5') molecular weight distribution: 2 to 2.3, and a6') heat resistance measured by a time until yellowing at 170° C. (YI value greater than 0): 8 to 15 hours.

Specifically, the polypropylene resin composition exhibits high melt index(MI) of 400 to 1500 g/10 min, and thus, may exhibit excellent fiber processability. More specifically, MI of the resin composition is 500 g/10 min or more, or 510 g/10 min or more, or 800 g/10 min or more, and 1500 g/10 min or less, or 1300 g/10 min or less, or 1250 g/10 min or less, or 1220 g/10 min or less. Meanwhile, in the present disclosure, MI of the resin composition may be measured under load of 2.16 kg at 230° C. according to ASTM D 1238.

In the present disclosure, fiber processability means preparing more fine denier and high strength fiber, by enabling high rate drawing due to uniform molecular weight distribution, when conducting a drawing process. If MI is less than 400 g/10 min, processing temperature or processing pressure may increase, and thus, processability may be deteriorated, and the diameter of prepared fiber may significantly increase. And, if MI of the resin composition is greater than 1500 g/10 min, although fiber having small diameter may be prepared with low viscosity, it may be difficult to pelletize, and compatibility with additives such as an antioxidant may be deteriorated, and thus, there is a concern about OIT decrease and yellowing. Since the pellet type polypropylene resin composition according to the invention has melt index in the controlled range of 400 to 1500 g/10 min, fine denier and high strength fiber can be prepared.

And, the pellet type polypropylene resin composition has high melting temperature(Tm) of 154° C. or more, as well as high MI. Since it has high melting temperature, recrystallization temperature may increase, and it may have high tacticity, and thus, exhibit excellent heat resistance. If the melting temperature is less than 154° C., heat resistance may be deteriorated, and there is a concern about thermal decomposition when processing fiber at high temperature. More specifically, the pellet type polypropylene resin composition may have melting temperature of 154° C. or more, or 155° C. or more, or 156° C. or more, and considering excellent heat stability as well as sufficient processability required for fiber processing, the melting temperature may be 170° C. or less, or 160° C. or less.

Meanwhile, in the present disclosure, melting temperature of the pellet type polypropylene resin composition may be measured using Differential Scanning calorimeter(DSC). Specifically, a polypropylene resin composition is heated to 200° C., and the temperature is maintained for 5 minutes and decreased to 30° C., and then, the temperature is increased to 200° C. again. Wherein, temperature increase speed and decrease speed are respectively controlled to 10° C./min, and the melting temperature is the maximum point of an endothermic peak measured in the second temperature increase section.

And, the pellet type polypropylene resin composition has high recrystallization temperature(Trc) of 112° C. or more. Thus, it is rapidly crystallized during extrusion process, thereby enabling preparation of pellet type resin. And, it has high tacticity, and thus, may exhibit excellent heat resistance. If recrystallization temperature is less than 112° C., heat resistance may decrease, and there is a concern about thermal decomposition when processing fiber at high temperature. More specifically, recrystallization temperature of the pellet type polypropylene resin composition may be 120° C. or more, and considering excellent heat stability as well as sufficient processability required for fiber processing, the recrystallization temperature may be 140° C. or less, or 130° C. or less.

In the present disclosure, the recrystallization temperature (Trc) of the pellet type polypropylene resin composition may be measured using DSC, in the same manner as the measurement of melting temperature. Specifically, a polypropylene resin composition is heated to 200° C., and then, the temperature is maintained for 5 minutes, decreased to 30° C., and increased to 200° C. again, and then, decreased again at 10° C./min. Wherein, temperature increase speed and decease speed are respectively controlled to 10° C./min, and the recrystallization temperature is the maximum point of an endothermic peak measured in the section where the temperature is decreased again at 10° C./min, namely the second temperature decrease section.

And, the pellet type polypropylene resin composition may have xylene solubles (Xs) of 1.0 wt % or less, thus exhibiting high tacticity.

In the present disclosure, xylene soluble is the measurement of the content(wt %) of soluble polymer in crystallized cooled xylene obtained by dissolving a polypropylene resin composition in xylene, and then, cooling, and crystallizing insoluble parts from the cooled solution, and the xylene soluble comprises polymer chains of low tacticity. Thus, the lower the xylene soluble, higher tacticity polymer has. The polypropylene resin composition according to one embodiment of the invention exhibits low xylene solubles of 1.0 wt % or less, and thus, has high tacticity, thereby exhibiting excellent rigidity and flexural modulus. The xylene solubles may be adjusted by controlling the kind of catalyst used, the content of comonomers, and the like, and considering the excellent rigidity and flexural modulus improvement effect according to control of xylene solubles, the xylene solubles of the polypropylene resin composition may be more specifically 0.1 wt % or more, or 0.2 wt % or more, and 0.5 wt % or less, or 0.4 wt % or less.

Meanwhile, in the present disclosure, xylene solubles of the polypropylene resin composition may be obtained by introducing xylene in a polypropylene resin composition sample, heating at 135° C. for 1 hour and cooling for 30 minutes for pre-treatment, and then, dripping xylene at a flow rate of 1 mL/min for 4 hours in OminiSec(Viscotek Corporation FIPA) apparatus to stabilize base lines of RI, DP, IP, and then, recording and measuring the concentration and injection amount of the pretreated sample, and then, calculating a peak area.

And, the pellet type polypropylene resin composition may exhibit narrow molecular weight distribution(MWD) of less than 2.4. Thus, it exhibits excellent fiber processability, and can be used to prepare fine denier fiber. More specifically, MWD may be 2.3 or less, or 2.2 or less, and 2.0 or more, or 2.1 or more.

Meanwhile, in the present disclosure, the molecular weight distribution(MWD) of the pellet type polypropylene resin composition may be determined by measuring weight average molecular weight(Mw) and number average molecular weight(Mn) of the resin composition using gel permeation chromatography(GPC), and then, calculating the ratio(Mw/Mn) of the weigh average molecular weight to the number average molecular weight. Specific measurement method and conditions will be explained in Experimental Examples below.

The pellet type polypropylene resin composition according to one embodiment of the invention exhibits high flow without using decomposition accelerator, as explained above, and it has high melting temperature and recrystallization temperature, low xylene solubles and narrow molecular weight distribution, thus exhibiting excellent heat resistance and oxidation stability.

Specifically, the pellet type polypropylene resin composition may have OIT(oxidation induction time), measured under conditions of 200° C. and 50 ml/min oxygen($O_2$) according to ASTM D3985, of 30 minutes or more, more specifically 30 to 50 minutes, or 32 to 40 minutes, thus exhibiting excellent oxidation stability.

Meanwhile, in the present disclosure, OIT is the measurement of oxidation time under conditions of 200° C. and 50 ml/min oxygen($O_2$) according to ASTM D3985, using thermal analysis device such as DSC(differential scanning calorimeter), and will be explained in more detail in Experimental Example below.

And, by measuring a time taken until a resin composition is discolored, specifically yellowed at high temperature of 170° C., heat resistance of the resin composition may be evaluated, and the pellet type polypropylene resin composition has heat resistance measured under the above described conditions of 8 hours or more, more specifically 8 to 15 hours, or 8 to 12 hours. As such, since it exhibits excellent heat resistance and oxidation stability as well as high flow, it may be more usefully used for the preparation of melt blown fiber.

Meanwhile, in the present disclosure, yellowing means that YI value measured using a color-difference meter is greater than 0, and the YI value is a value measured at 25° C. using a color-difference meter(X-rite CE7000A) according to the standard method of ASTM D1925.

The pellet type polypropylene resin composition according to one embodiment of the invention having the above described properties may be prepared by a method comprising steps of: conducting polymerization of propylene monomers while introducing hydrogen gas, in the presence of a catalyst composition comprising a transition metal compound represented by the following Chemical Formula 1, to prepare homo polypropylene (Step 1); and mixing the homo polypropylene with an antioxidant to prepare a mixed composition, and then, extruding and pelletizing (Step 2). Thus, according to another embodiment of the invention, there is provided a method for preparing the above described pellet type polypropylene resin composition:

[Chemical Formula 1]

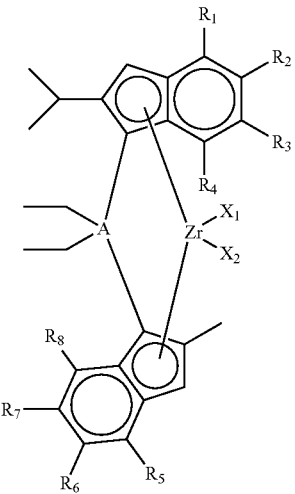

in the Chemical Formula 1,

A is carbon, silicon or germanium, $X_1$ and $X_2$ are each independently, halogen, $R_1$ and $R_5$ are each independently, $C_{6-20}$ aryl substituted with $C_{1-20}$ alkyl, $R_2$ to $R_4$, and $R_6$ to $R_8$ are each independently, hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl.

Meanwhile, unless specifically limited, the following terms may be defined as follows.

Halogen may be fluorine(F), chlorine(Cl), bromine(Br) or iodine(I).

A C$_{1-20}$ alkyl group may be a linear, branched or cyclic alkyl group. Specifically, the C$_{1-20}$ alkyl group may be a C$_{1-15}$ linear alkyl group; a C$_{1-10}$ linear alkyl group; a C$_{1-5}$ linear alkyl group; a C$_{3-20}$ branched or cyclic alkyl group; a C$_{3-15}$ branched or cyclic alkyl group; or a C$_{3-10}$ branched or cyclic alkyl group. More specifically, the C1-20 alkyl group may be methyl, ethyl group, n-propyl, iso-propyl, n-butyl, iso-butyl, tert-butyl, n-pentyl, iso-pentyl, neo-pentyl or cyclohexyl group, and the like.

A C$_{2-20}$ alkenyl group may be a linear, branched or cyclic alkenyl group. Specifically, the C$_{2-20}$ alkenyl group may be a C$_{2-20}$ linear alkenyl group, a C$_{2-10}$ linear alkenyl group, a C$_{2-5}$ linear alkenyl group, a C$_{3-20}$ branched alkenyl group, a C$_{3-15}$ branched alkenyl group, a C$_{3-10}$ branched alkenyl group, a C$_{5-20}$ cyclic alkenyl group or a C$_{5-10}$ cyclic alkenyl group. More specifically, the C$_{2-20}$ alkenyl group may be ethenyl, propenyl, butenyl, pentenyl or cyclohexenyl group, and the like.

A C$_{6-30}$ aryl means monocyclic, bicyclic or tricyclic aromatic hydrocarbon. Specifically, the C$_{6-30}$ aryl may be phenyl, naphthyl or anthracenyl group, and the like.

A C$_{7-30}$ alkylaryl means aryl of which one or more hydrogen atoms are substituted with alkyl. Specifically, the C$_{7-30}$ alkylaryl may be methylphenyl, ethylphenyl, n-propylphenyl, iso-propylphenyl, n-butylphenyl, iso-butylphenyl, tert-butylphenyl or cyclohexylphenyl, and the like.

A C$_{7-30}$ arylalkyl means alkyl of which one or more hydrogen atoms are substituted with aryl. Specifically, the C$_{7-30}$ arylalkyl may be benzyl, phenylpropyl or phenylhexyl and the like.

In the above preparation method, the catalyst composition comprises a transition metal compound represented by the Chemical Formula 1 as a single catalyst. Thus, compared to the case of using two or more catalysts in combination, molecular weight distribution of prepared homo polypropylene may become remarkably narrow.

Moreover, since the compound of the Chemical Formula 1 comprises a divalent functional group A di-substituted with ethyl groups as a bridge group connecting two ligands including indenyl groups, an atom size increases compared to the existing carbon bridge, an available angle increase, and monomer approach is easy, and thus, more excellent catalytic activity may be exhibited. And, two ethyl groups bonded to A may increase solubility and improve support efficiency, and solve the problem of decrease in support reactivity due to poor solubility when preparing a supported catalyst, in case a methyl group is included as a substituent of a bridge in the prior art.

And, since the positions 2 of two indenyl ligands are respectively substituted with a methyl group and an isopropyl group, low molecular weight polymer can be prepared due to appropriate steric hindrance, and since both indenyl ligands comprise aryl groups in which positions 4 (R$_1$ and R$_5$) are substituted with alkyl, more excellent catalytic activity may be exhibited by inductive effect of supplying sufficient electrons. As the result, linear chain branch(LCB) is formed at appropriate rate/distribution in the structure of homo polypropylene, thereby preparing high flow homo polypropylene.

And, the compound of the Chemical Formula 1 comprises zirconium(Zr) as a center metal, and thus, compared to the case of comprising other Group 14 elements such as Hf and the like, it has more orbitals capable of accepting electrons, and can easily bond with monomer with higher affinity, thereby exhibiting more excellent catalytic activity improvement effect.

More specifically, in the Chemical Formula 1, A may be silicon.

And, in the Chemical Formula 1, R$_1$ and R$_5$ may be each independently, C$_{6-20}$ aryl substituted with C$_{1-20}$ alkyl, more specifically, phenyl substituted with C$_{3-6}$ branched alkyl, such as tert-butyl phenyl. And, the alkyl substitution position to the phenyl may be a position 4 corresponding to a para position to R$_1$ or R$_5$ bonded to indenyl.

And, in the Chemical Formula 1, all R$_2$ to R$_4$, and R$_6$ to R$_8$ may be hydrogen, and both X$_1$ and X$_2$ may be chloro.

Representative examples of the compounds represented by the Chemical Formula 1 are as follows:

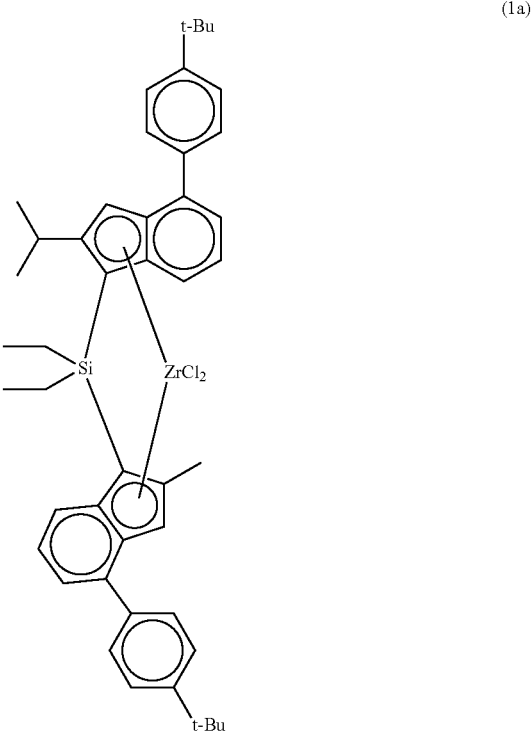

(1a)

The compound of the Chemical Formula 1 may be synthesized applying known reactions, and for more detailed synthesis method, preparation examples described later may be referred to.

Meanwhile, the compound of the Chemical Formula 1 may be used as a single component, or it may be used in the form of a supported catalyst, while being supported in a carrier.

When used in the form of a supported catalyst, particle shape and bulk density of prepared polymer may be excellent, and it may be suitably used for the conventional slurry polymerization or bulk polymerization, or gas phase polymerization process.

As specific examples of the carrier, silica, alumina, magnesia, silica-alumina, silica-magnesia, and the like may be mentioned, and they may commonly further comprise oxide, carbonate, sulfate and nitrate components, such as Na$_2$O, K$_2$CO$_3$, BaSO$_4$, and Mg(NO$_3$)$_2$ and the like. Among them, in case a silica carrier is used, the transition metal compound is chemically bonded with reactive functional groups such as a siloxane group existing on the surface of the silica carrier, catalyst is hardly isolated from the carrier surface during propylene polymerization, thereby minimizing fouling wherein polymer particles stick to a reactor wall surface or each other, when preparing polypropylene by slurry or gas phase polymerization.

In case the compound of the Chemical Formula 1 is supported in a carrier, and for example, the carrier is silica, the compound of the Chemical Formula 1 may be supported in the content of 40 μmol or more, or 80 μmol or more, and 240 μmol or less, or 160 μmol or less, based on 1 g of silica. When supported in the above content range, appropriate activity of the supported catalyst may be exhibited, and thus, it may be favorable in terms of catalytic activity maintenance and economical efficiency.

And, the catalyst composition may further comprise a cocatalyst in terms of high activity and improvement in process stability.

The cocatalyst may comprise one or more selected from compounds represented by the following Chemical Formula 2, compounds represented by the following Chemical Formula 3, and compounds represented by the following Chemical Formula 4:

$$—[Al(R_{11})—O]_m—$$ [Chemical Formula 2]

In the Chemical Formula 2, $R_{11}$'s are identical or different, and are each independently, halogen; $C_{1-20}$ hydrocarbon; or $C_{1-20}$ hydrocarbon substituted with halogen;

m is an integer of 2 or more;

$$J(R_{12})_3$$ [Chemical Formula 3]

In the Chemical Formula 3, $R_{12}$'s are identical or different, and are each independently, halogen; $C_{1-20}$ hydrocarbon; or $C_{1-20}$ hydrocarbon substituted with halogen;

J is aluminum or boron;

$$[E-H]^+[ZD_4]^- \text{ or } [E]^+[ZD_4]^-$$ [Chemical Formula 4]

In the Chemical Formula 4,

E is neutral or cationic Lewis base;

H is hydrogen atom;

Z is Group 13 element;

D's are identical or different, and are each independently, a $C_{6-20}$ aryl group or $C_{1-20}$ alkyl group, of which one or more hydrogen atoms are unsubstituted or substituted with halogen, $C_{1-20}$ hydrocarbon, alkoxy or phenoxy.

As the examples of the compound represented by the Chemical Formula 2, alkylaluminoxane based compounds, such as methylaluminoxane, ethylaluminoxane, isobutylaluminoxane or butylaluminoxane and the like, may be mentioned, and among them, one or mixtures of two or more may be used.

And, as the examples of the compound represented by the Chemical Formula 3, trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, or tributylboron and the like, may be mentioned, and among them, one or mixtures of two or more may be used.

And, as the examples of the compound represented by the Chemical Formula 4, triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetarphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl) boron, tributylammonium tetra(p-trifluoromethylphenyl) boron, triphenylcarbonium tetra(p-trifluoromethylphenyl) boron, or triphenylcarbonium tetrapentafluorophenylboron and the like, may be mentioned, and among them, one or mixtures of two or more may be used.

The cocatalyst may be, more specifically, an alkylaluminoxane based cocatalyst such as methylaluminoxane.

The alkylaluminoxane based cocatalyst comprises a metal element that can stabilize the transition metal compound of the Chemical Formula 1, and act as Lewis acid to form a bond through Lewis acid-base interaction with the functional group introduced in the bridge group of the transition metal compound of the Chemical Formula 1, thereby further enhancing catalytic activity.

And, the content of the cocatalyst may be appropriately controlled according to the aimed properties and effects of the catalyst and resin composition. For example, in case silica is used as the carrier, the cocatalyst may be supported in the content of 8 mmol or more, or 10 mmol or more, and 25 mmol or less, or 20 mmol or less, per carrier weight, for example, based on 1 g of silica.

More specifically, considering the effects of catalytic activity increase and polymer property improvement, and the like, according to the combination of a carrier and a cocatalyst in the catalyst composition, the catalyst composition may further comprise a silica carrier and an alkylaluminoxane based cocatalyst, and specific contents thereof are as explained above.

The catalyst composition having the above construction may be prepared by a method comprising steps of supporting a cocatalyst compound in a carrier, and supporting a transition metal compound represented by the Chemical Formula 1 in the carrier, wherein the sequence of supporting the cocatalyst and the transition metal compound represented by the Chemical Formula 1 may be changed as necessary. Considering the effects of the supported catalyst having a structure determined by the supporting sequence, when a cocatalyst is supported in a carrier and then a transition metal compound is supported, the prepared supported catalyst may realize high catalytic activity and more excellent process stability during the preparation process of polypropylene.

And, the catalyst composition may be used for polymerization per se, or it may be prepolymerized through contact with propylene monomers before used for polymerization.

In the latter case, the preparation method according to one embodiment of the invention may further comprise a step of contacting a catalyst composition with propylene monomers to prepolymerize, before preparing homo polypropylene through polymerization.

Commonly, in case a high activity supported catalyst is used, polymerization first occurs on the surface of a carrier, and produced polymer is crystallized and inhibits monomer diffusion, and thus, empty polymer is formed, and apparent density is deteriorated. Thus, in the present disclosure, by conducting prepolymerization under low temperature condition, monomer diffusion speed inside a carrier may be controlled, thereby easily controlling and improving morphology of polymer.

Specifically, the prepolymerization may be conducted by contacting the catalyst composition with propylene monomers at 10 to 40° C., more specifically 10 to 20° C. When conducting under the above described temperature and pressure conditions, monomer diffusion speed may be easily controlled and the morphology of prepared polymer may be easily controlled.

The prepolymerization may be conducted in the presence of an organo-aluminum compound (for example, triethylaluminum), and since monomers serves as a solvent, there is no need to introduce a separate solvent. And, although a reactor for prepolymerization is not specifically limited, for example, it may be conducted through a Spheripol process in a loop reactor.

The prepolymerization may be conducted for 3 to 10 minutes, or 4 to 7 minutes, and more specifically, it may be conducted such that polymerization degree of polymer after prepolymerization may become 100 to 200.

Next, a process of preparing homo polypropylene is conducted through a polymerization process of contacting a catalyst composition comprising a transition metal compound of the Chemical Formula 1 with propylene monomers in the presence of hydrogen gas.

Wherein, the hydrogen gas performs functions for activating the inactive sites of the metallocene catalyst and causing chain transfer reaction, thus control molecular weight. The metallocene compound of the present disclosure has excellent hydrogen reactivity, and thus, by controlling the amount of hydrogen gas used during a polymerization process, polypropylene having desired molecular weight and melt index may be effectively obtained.

The hydrogen gas may be introduced in the amount of 500 to 1000 ppm, based on the total weight of propylene monomers, and more specifically, it may be introduced in the amount of 500 ppm or more, or 550 ppm or more, or 600 ppm or more, and 1000 ppm or less, or 900 ppm or less. By progressing polymerization while supplying hydrogen gas in such an amount, homo polypropylene having narrow molecular weight distribution and high flow may be prepared.

And, the polymerization of homo polypropylene may be conducted by a continuous polymerization process, and for example, various polymerization processes known as a polymerization process of olefin monomers, such as solution polymerization, slurry polymerization, suspension polymerization, or emulsion polymerization, and the like, may be adopted. Particularly, for realization of narrow molecular weight distribution and high flow in the prepared homo polypropylene, and industrial production of the product, a continuous bulk slurry polymerization process in which a catalyst, propylene monomers, and optionally, hydrogen gas are continuously introduced, may be adopted. For example, in the present disclosure, the polymerization may be conducted through Spheripol process using a loop reactor.

And, the polymerization may be conducted at a temperature of 40° C. or more, or 60° C. or more, or 70° C. or more, and 110° C. or less or 100° C. or less, and under pressure of 1 kgf/cm$^2$ or more, or 5 kgf/cm$^2$ or more, and 100 kgf/cm$^2$ or less, or 50 kgf/cm$^2$ or less. When the polymerization is progressed under such temperature and pressure, homo polypropylene with aimed high flow may be prepared with high yield.

And, during the polymerization, trialkylaluminum such as triethylaluminum may be further introduced in the content of 0.01 wt % or more, or 0.05 wt % or more, or 0.1 wt % or more, and 1 wt % or less, or 0.5 wt % or less, based on the total weight of the propylene monomers. If moisture or impurity exists in a polymerization reactor, a part of a catalyst may be decomposed, but since the trialkylaluminum serves as a scavenger previously picking out moisture or impurity existing in the reactor, it can maximize the activity of a catalyst used for preparation, and thus, efficiently prepare homo polypropylene fulfilling the above described properties.

And, in the polymerization reaction, the catalyst composition may be used in the form of a mud catalyst mixed with oil and grease. In this case, compared to the conventional case wherein a catalyst composition is dissolved or diluted in C5 to 12 aliphatic hydrocarbon solvent, such as pentane, hexane, heptanes, nonane, decane, and isomers thereof; aromatic hydrocarbon solvent, such as toluene, benzene; chlorine-substituted hydrocarbon solvent, such as dichloromethane, dichlorobenzene, and the like, during propylene polymerization, the amount of volatile organic compounds contained in the prepared resin may remarkably decrease, and thus, odor caused thereby may also decrease.

Homo polypropylene prepared through the above explained polymerization process exhibits high flow, low xylene solubles and narrow molecular weight distribution, due to the use of a metallocene compounds having excellent hydrogen reactivity. Thus, when preparing a pellet type polypropylene resin composition, excellent fiber processability may be exhibited without a visbreaking process using a decomposition accelerator, and since a decomposition accelerator used in visbreaking is not used, deterioration of heat resistance and oxidation stability of the prepared resin composition may be prevented.

Next, the prepared homo polypropylene is mixed with an antioxidant to prepare a mixed composition, and then, it is extruded and pelletized, thus preparing a pellet type polypropylene resin composition.

The preparation of the mixed composition may be conducted by mixing the homo polypropylene with an antioxidant, wherein the kinds and contents of the homo polypropylene and antioxidant are as explained above.

And, when preparing the mixed composition, a lubricant may be further introduced, wherein specific kind and introduction amount of the lubricant are as explained above.

And, when preparing the mixed composition, one or more additives such as a neutralization agent, a slip agent, an anti-blocking agent, an UV stabilizer, an anti-static agent, and the like, may be further introduced, and specific kind and introduction amount thereof are as explained above.

Next, extrusion and pelletizing process of the mixed composition may be conducted according to a common extrusion process using a twin screw extruder, except that a die temperature for melting the mixed composition is controlled to 150 to 250° C.

The die temperature during extrusion lowers temperature of molten-state resin, and increases viscosity, thus enabling pelletizing. In the present disclosure, if the die temperature is less than 150° C., homo polypropylene in the mixed composition may not be sufficiently molten, and thus, pelletizing may not be sufficiently achieved, or it may be solidified to block inside of a die, thus decreasing productivity. And, if the die temperature is greater than 250° C., viscosity may become too low and it may flow like fluid, and thus, it cannot be cut into a pellet shape, thus rendering pelletizing difficult. More specifically, the die temperature may be 160° C. or more, or 180° C. or more, and 230° C. or less, or 220° C. or less.

And, in case die pressure is further controlled as well as the die temperature, the die pressure may be 20 bar or more, or 30 bar or more, and 50 bar or less, or 35 bar or less. When the pressure is controlled within such a range, the shape and properties of a pellet type polypropylene resin may be more easily realized.

More specifically, in the preparation method according to one embodiment of the invention, the extrusion and pelletizing process of the mixed composition may be conducted by underwater pelletizing(UWP). The UWP method is more appropriate for pelletizing of a high flow resin composition, because a cutting process is achieved simultaneously with cooling by cooling water unlike common pelletizing methods.

The die temperature during the extrusion and pelletizing by UWP may be, as explained above, 150 to 250° C., more specifically 160° C. or more, or 180° C. or more, and 230° C. or less, or 220° C. or less.

And, since cooling and cutting processes are simultaneously achieved in the UWP method, it is preferable to simultaneously control the temperature of cooling water and the rotation speed of a cutter so as to increase pelletizing efficiency. Specifically, the temperature of cooling water may be 40 to 80° C., and the rotation speed of a cutter may be 400 to 1,000 rpm. More specifically, the temperature of cooling water may be 40° C. or more, 60° C. or more, and 80° C. or less, or 70° C. or less, and the rotation speed of a cutter may be 400 rpm or more, or 500 rpm or more, and 1,000 rpm or less, or 800 rpm or less, or 650 rpm or less.

The polypropylene resin composition prepared by the above method has a pellet shape, comprises an antioxidant as well as homo polypropylene, and exhibits the above explained properties. Thus, it has excellent fiber processability without using a peroxide based decomposition accelerator conventionally used when preparing fiber, and thus, can be used to prepare fine denier fiber, and exhibit excellent heat resistance and oxidation stability. Thus, it is particularly useful in the field of preparation of fiber requiring excellent filter efficiency, such as a filer or mask, and the like.

Thus, according to another embodiment of the invention, there is provided fiber, more specifically non-woven fabric, prepared using the pellet type polypropylene resin composition.

Hereinafter, preferable examples are presented for better understanding of the invention. However, there examples are presented only as illustrations of the invention, and the scope of the invention is not limited thereby.

Synthesis Example 1: Preparation of Catalyst 3 g of silica was previously weighed in a Schlenk Flask, and then, 52 mmol of methylaluminoxane(MAO) was put, and they were reacted at 90° C. for 24 hours. After precipitation, the upper part was removed, and the remainder was washed with toluene twice. 240 μmol of a transition metal compound(1a) of the following structure was dissolved in toluene and added to a reactor, and then, reacted at 70° C. for 5 hours. After the reaction was finished and precipitation was finished, the upper part solution was removed, and the remaining reaction product was washed with toluene, and then, washed again with hexane, and vacuum dried to obtain 5 g of a silica-supported metallocene catalyst in the form of solid particles.

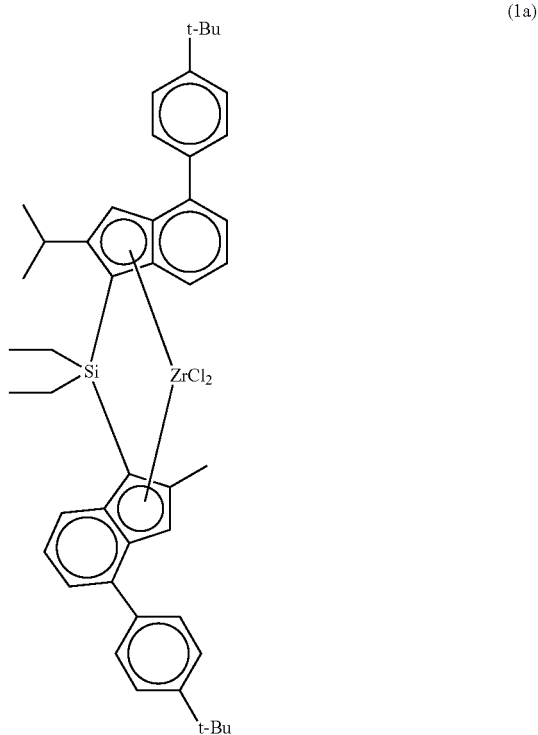

(1a)

Synthesis Example 2: Preparation of Catalyst

A silica-supported metallocene catalyst was prepared by the same method as Synthesis Example 1, except that a transition metal compound(I) of the following structure was used instead of the transition metal compound of the Chemical Formula 1a in the Synthesis Example 1.

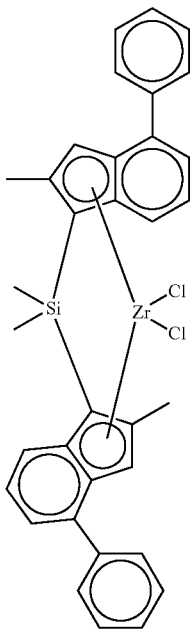

(I)

<Preparation of Homo Polypropylene>

Preparation Example 1

In the presence of the silica-supported metallocene catalyst prepared in Synthesis Example 1, under the conditions described in the following Table 1, a bulk-slurry polymerization process of propylene(C3) was conducted using continuous two loop reactors (Spheripol process) to prepare homo polypropylene.

Specifically, first, under the conditions described in the following Table 1, 1.1 g/hr of the silica-supported metallocene catalyst prepared in Synthesis Example 1 and propylene monomers(C3) were introduced in the reactor, and contacted to conduct prepolymerization (operation temperature: 20° C., polymerization degree: 100~200, polymerization time: 4~7 minutes). Wherein, the catalyst was introduced in the form of a 16 wt % mud catalyst mixed with oil and grease.

Subsequently, in the reactor, propylene monomers(C3), triethylaluminum(TEAL) and hydrogen gas were introduced respectively using a pump under the conditions described in the following Table 1, and polymerization was conducted. Wherein, homo polypropylene was prepared while maintaining the reactor temperature of 70° C., the pressure of 35 kg/cm$^2$, and hourly productivity of 40 kg.

Preparation Examples 2 and 3

Homo polypropylene was prepared by the same method as Preparation Example 1, except that the process was conducted under the conditions described in the following Table 1.

Comparative Preparation Example 1

As homo polypropylene, H7910® (LG Chem) prepared by polymerizing after conducting prepolymerization, using a Ziegler-natta(Z/N) catalyst, was used.

Comparative Preparation Example 2

As homo polypropylene, H7912® (LG Chem) prepared by polymerizing after conducting prepolymerization, using a Ziegler-natta(Z/N) catalyst, was used.

Comparative Preparation Example 3

As homo polypropylene, MF650W® (Polymirae Company) prepared using a metallocene catalyst, was used.

Comparative Preparation Example 4

As homo polypropylene, MF650X® (Polymirae Company) prepared using a metallocene catalyst, was used.

Comparative Preparation Examples 5 to 8

Homo polypropylene was prepared by the same method as Preparation Example 1, except that a silica-supported metallocene catalyst prepared in Synthesis Example 2 was used instead of the silica-supported metallocene catalyst prepared in Synthesis Example 1, and the process was conducted under the conditions described in the following Table 1.

Experimental Example 1

The activity of the catalysts used in Preparation Examples and Comparative Preparation Examples, and melt index, xylene soluble and molecular weight distribution of homo polypropylene according to Preparation Examples and Comparative Preparation Examples were measured, and shown in the following Table 1.

(1) Catalytic activity (Activity, kgPP/gSiO$_2$): When preparing homo polypropylene according to Preparation Examples 1~3 and Comparative Preparation Examples 5~8, the weight(gSiO$_2$) of the catalyst used for polymerization, and the weight(kgPP) of polypropylene prepared from the polymerization were respectively measured, and the value obtained by dividing the measured kgPP by gSiO$_2$ was indicated as catalytic activity.

(2) Melt index(MI, 2.16 kg) (g/10 min): For the homo polypropylene of Preparation Examples 1~3 and Comparative Preparation Examples 1~8, melt index was measured under load of 2.16 kg at 230° C. according to ASTM D1238, and indicated by the weight(g) of polymer that was molten and came out for 10 minutes.

(3) Xylene Soluble(X.S.)(wt %): In a homo polypropylene sample, xylene was put, heated at 135° C. for 1 hour, and cooled for 30 minutes to conduct pretreatment. In OminiSec (Viscotek Corporation FIPA) device, xylene was flowed at a flow rate of 1 mL/min for 4 hours, and if base lines of RI, DP, IP were stabilized, the concentration and injection amount of the pretreated sample were recorded and measured, and then, a peak area was calculated.

(4) Molecular weight distribution(MWD): Weight average molecular weight(Mw) and number average molecular weight(Mn) of homo polypropylene were respectively measured using gel permeation chromatography(GPC), and the measured weight average molecular weight was divided by the number average molecular weight to calculate molecular weight distribution (MWD, i.e., Mw/Mn).

Specifically, as gel permeation chromatography(GPC) device, Waters PL-GPC220 was used, and Polymer Laboratories PLgel MIX-B 300 mm length column was used. Wherein, measurement temperature was 160° C., 1,2,4- trichlorobenzene was used as a solvent, and flow rate was 1 mL/min. The homo polypropylene samples were respectively prepared at a concentration of 10 mg/10 mL, and then, fed in an amount of 200 μL. Using a calibration curve formed using a polystyrene standard specimen, Mw and Mn values were derived. As the polystyrene standard specimens, 9 kinds having weight average molecular weight of 2,000 g/mol/10,000 g/mol/30,000 g/mol/70,000 g/mol/200,000 g/mol/700,000 g/mol/2,000,000 g/mol/4,000,000 g/mol/10,000,000 g/mol were used.

TABLE 1

| | Kind of catalyst | Catalyst introduction amount (g/hr) | Prepolymerization temperature (° C.) | Polymerization pressure (kg/cm³) | Polymerization temperature (° C.) | C3 introduction amount (kg/hr) |
|---|---|---|---|---|---|---|
| Comparative Preparation Example 1 | Ziegler-Natta | — | 10 | — | — | — |
| Comparative Preparation Example 2 | Ziegler-Natta | — | 10 | — | — | — |
| Comparative Preparation Example 3 | Metallocene | — | — | — | — | — |
| Comparative Preparation Example 4 | Metallocene | — | — | — | — | — |
| Comparative Preparation Example 5 | Synthesis Example2 | 1.1 | 20 | 35 | 70 | 80 |
| Comparative Preparation Example 6 | Synthesis Example2 | 1.1 | 20 | 35 | 70 | 80 |
| Comparative Preparation Example 7 | Synthesis Example2 | 1.0 | 20 | 35 | 70 | 80 |
| Comparative Preparation Example 8 | Synthesis Example2 | 1.3 | 20 | 35 | 70 | 80 |
| Preparation Example 1 | Synthesis Example1 | 1.1 | 20 | 35 | 70 | 80 |
| Preparation Example 2 | Synthesis Example1 | 0.9 | 20 | 35 | 70 | 80 |
| Preparation Example 3 | Synthesis Example1 | 0.8 | 20 | 35 | 70 | 80 |

| | TEAL introduction amount (ppm) | Hydrogen introduction amount (ppm) | Catalytic activity (kg/g-cat) | MI (g/10 min) | X.S (wt %) | MWD |
|---|---|---|---|---|---|---|
| Comparative Preparation Example 1 | — | — | — | 960 | 2.2 | 3.1 |
| Comparative Preparation Example 2 | — | — | — | 1190 | 2.3 | 3.3 |
| Comparative Preparation Example 3 | — | — | — | 510 | 0.5 | 2.1 |
| Comparative Preparation Example 4 | — | — | — | 1290 | 0.4 | 2.3 |
| Comparative Preparation Example 5 | 50 | 650 | 36.4 | 512 | 0.6 | 2.3 |
| Comparative Preparation Example 6 | 50 | 800 | 36.4 | 790 | 0.7 | 2.3 |
| Comparative Preparation Example 7 | 50 | 1000 | 40.0 | 1180 | 0.6 | 2.4 |
| Comparative Preparation Example 8 | 50 | 500 | 30.8 | 380 | 0.6 | 2.3 |
| Preparation Example 1 | 50 | 600 | 36.4 | 510 | 0.4 | 2.2 |
| Preparation Example 2 | 50 | 700 | 44.4 | 810 | 0.4 | 2.2 |
| Preparation Example 3 | 50 | 900 | 50.0 | 1220 | 0.3 | 2.2 |

<Preparation of Polypropylene Resin Composition>

Example 1

With the composition described in the following Table 2, based on 100 parts by weight of the homo polypropylene prepared in Preparation Example 1, 0.02 parts by weight of a lubricant and 0.10 parts by weight of an antioxidant 1(Irganox 3114®, BASF Corp.) were mixed, and then, extrusion and pelletizing process was conducted using UWP (under water pelletizer), thus preparing a polypropylene resin composition.

<UWP Operation Conditions>
Die temperature: 220° C.
Cutter rotation speed: 650 rpm
Cooling water temperature: 70° C.

Examples 2 to 9

Polypropylene resin compositions were prepared by the same method as Example 1, except mixing with the composition described in the following Table 2.

Comparative Examples 1 to 15

Polypropylene resin compositions were prepared by the same method as Example 1, except preparing under the conditions described in the following Table 2.

Experimental Example 2

For the polypropylene resin compositions prepared in Examples and Comparative Examples, properties were measured and evaluated as follows. The results were shown in the following Table 2.

(1) Appearance: Bulk density of the polypropylene resin composition was measured, and from the measurement values, pellet type and powder type were classified according to the following standard.

For the measurement of the bulk density, 100 g of the polypropylene resin composition was flowed through the orifice of standard flowmeter and received in a container with a volume of 100 ml, and shaved off such that the polypropylene resin composition became horizontal, thus controlling the volume of the polypropylene resin composition to 100 ml, and then, the weight of the polypropylene resin composition except the container was measured. And, the weight of the polypropylene resin composition was divided by the volume of the polypropylene resin composition, 100 ml, to calculate bulk density corresponding to the weight of the polypropylene resin composition per unit volume (unit: g/ml).

<Classification Standard>
Bulk density 0.25 g/ml or more and less than 0.35 g/ml: powder
Bulk density 0.35 g/ml or more and 0.60 g/ml or less: pellet (2) Melt index(MI, 2.16 kg) (g/10 min): Melt index of the polypropylene resin composition was measured under load of 2.16 kg at 230° C. according to ASTM D1238, and indicated as the weight(g) of the polymer that was molten and came out for 10 minutes.

(3) Melting temperature(Tm) (° C.): Using DSC (DSC 2920, TA instrument Inc.), the melting temperature of the polypropylene resin composition was measured. Specifically, the polypropylene resin composition was heated to 200° C., and the temperature was maintained for 5 minutes and decreased to 30° C., and then, increased again to 200° C. Wherein, the temperature increase and decrease speeds were respectively controlled to 10° C./min, and the melting temperature was the maximum point of an endothermic peak measured in the second temperature increase section.

(4) Recrystallization temperature(Trc) (° C.): Using DSC (DSC 2920, TA instrument, Inc.), recrystallization temperature was measured. Specifically, the polypropylene resin composition was heated to 200° C., and the temperature was maintained for 5 minutes, decreased to 30° C., and increased again to 200° C., and then, the temperature was decreased again. Wherein, the temperature increase and decrease speeds were respectively controlled to 10° C./min, and the recrystallization temperature was the maximum point of an endothermic peak measured in the second temperature decrease section.

(5) Xylene Soluble(wt %): In each polypropylene resin composition, xylene was introduced, and heated at 135° C. for 1 hour and cooled for 30 minutes to conduct pretreatment. And, in OminiSec(Viscotek Corporation FIPA) apparatus, xylene was flowed at a flow rate of 1 mL/min for 4 hours, and if base lines of RI, DP, IP were stabilized, the concentration and injection amount of the pretreated sample were recorded and measured, and then, a peak area was calculated.

(6) Molecular weight distribution(MWD, polydispersity index): Using gel permeation chromatography(GPC), weight average molecular weight(Mw) and number average molecular weight(Mn) of the polypropylene resin composition were measured, and the measured weight average molecular weight was divided by number average molecular weight to calculate molecular weight distribution (MDW, Mw/Mn).

Specifically, as gel permeation chromatography(GPC) device, Waters PL-GPC220 was used, and Polymer Laboratories PLgel MIX-B 300 mm length column was used. Wherein, measurement temperature was 160° C., 1,2,4-trichlorobenzene was used as a solvent, and flow rate was 1 mL/min. The homo polypropylene samples were respectively prepared at a concentration of 10 mg/10 mL, and then, fed in an amount of 200 μL. Using a calibration curve formed using a polystyrene standard specimen, Mw and Mn values were derived. As the polystyrene standard specimens, 9 kinds having weight average molecular weight of 2,000 g/mol/10,000 g/mol/30,000 g/mol/70,000 g/mol/200,000 g/mol/700,000 g/mol/2,000,000 g/mol/4,000,000 g/mol/10,000,000 g/mol were used.

(7) Oxidation Induction Time(OIT)(min): A time for which the polypropylene resin composition is oxidized in oxygen was measured using DSC according to ASTM D3985 (temperature: 200° C., $O_2$ introduction condition: 50 ml/min)

(8) Heat resistance (hr, 170° C.): The polypropylene resin composition was put in a convection oven at 170° C., and a time taken until yellowing was measured. YI value is measured at 25° C. using a color-difference meter(X-rite CE7000A) according to ASTM D1925, and when the value is greater than 0, it is defined as yellowing.

(9) Fiber Diameter

Fibers were prepared using the polypropylene resin compositions of Examples and Comparative Examples, and the diameter of prepared fiber was measured.

Specifically, for the polypropylene resin compositions prepared in Examples and Comparative Examples, spinning was progressed using spin-draw spinning machine. The resin was introduced into spinning machine, and molten resin was discharged from a die as fiber yarn, and then, cooled and solidified by cooling air current. The resulting undrawn yarn was passed through a roller and hot drawn, thus preparing polypropylene fiber. During spinning, the speed of Gear pump was 19 rpm, discharge amount per hole was 2.5 g/min/hole, spinning temperature(melting temperature) was 275° C., die temperature was 210° C., cooling temperature was 10° C., spinning speed was 600 m/min, roller speed(drawing speed) was 2400 m/min, roller temperature was 135° C., longitudinal draw ratio was 4 times, and winding speed was 2000 m/min.

For the prepared fibers, fiber diameters were measured using SEM(Scanning Electron Microscope), and the average value of the measured fiber diameters was shown.

TABLE 2

| | Example | | | | | | | | |
|---|---|---|---|---|---|---|---|---|---|
| Kind of homo polypropylene | 1 Preparation Example 1 | 2 Preparation Example 1 | 3 Preparation Example 1 | 4 Preparation Example 2 | 5 Preparation Example 2 | 6 Preparation Example 2 | 7 Preparation Example 3 | 8 Preparation Example 3 | 9 Preparation Example 3 |
| antioxidant A (parts by weight) | 0.10 | — | — | 0.10 | — | — | 0.10 | — | — |
| antioxidant B (parts by weight) | — | 0.10 | — | — | 0.10 | — | — | 0.10 | — |
| antioxidant C (parts by weight) | — | — | 0.10 | — | — | 0.10 | — | — | 0.10 |
| lubricant (parts by weight) | 0.02 | — | 0.02 | 0.02 | — | 0.02 | 0.02 | — | 0.02 |
| Decomposition accelerator (parts by weight) | — | — | — | — | — | — | — | — | — |
| Extrusion and pelletizing | conducted | conducted | conducted | conducted | conducted | conducted | conducted | conducted | Conducted |
| Appearance of resin composition | pellet | pellet | pellet | pellet | pellet | pellet | pellet | pellet | Pellet |
| MI (g/10 min) | 510 | 510 | 510 | 810 | 810 | 810 | 1220 | 1220 | 1220 |
| Tm (° C.) | 156 | 156 | 156 | 157 | 157 | 157 | 157 | 157 | 157 |
| Trc (° C.) | 120 | 120 | 120 | 120 | 120 | 120 | 121 | 121 | 121 |
| X.S. (wt %) | 0.4 | 0.4 | 0.4 | 0.4 | 0.4 | 0.4 | 0.3 | 0.3 | 0.3 |
| MWD | 2.2 | 2.2 | 2.2 | 2.2 | 2.2 | 2.2 | 2.2 | 2.2 | 2.2 |
| OIT (min) | 35.3 | 33.1 | 37.3 | 36.4 | 32.7 | 39.4 | 36.7 | 33.4 | 38.5 |
| Heat resistance (hr, 170° C.) | 10 | 8 | 12 | 10 | 8 | 12 | 10 | 8 | 12 |
| Fiber diameter (μm) | 1.4 | 1.4 | 1.3 | 1.1 | 1.2 | 1.1 | 1.0 | 1.0 | 0.9 |

TABLE 3

| | Comparative Example | | | | | | | |
|---|---|---|---|---|---|---|---|---|
| Kind of homo polypropylene | 1 Comparative Preparation Example 1 | 2 Comparative Preparation Example 2 | 3 Comparative Preparation Example 3 | 4 Comparative Preparation Example 4 | 5 Comparative Preparation Example 5 | 6 Comparative Preparation Example 5 | 7 Comparative Preparation Example 5 | 8 Comparative Preparation Example 6 |
| antioxidant A (parts by weight) | 0.10 | 0.10 | — | — | 0.10 | — | — | 0.10 |
| antioxidant B (parts by weight) | — | — | 0.10 | 0.10 | — | 0.10 | — | — |
| antioxidant C (parts by weight) | — | — | — | — | — | — | 0.10 | — |
| antioxidant D (parts by weight) | — | — | — | — | — | — | — | — |
| lubricant (parts by weight) | 0.02 | 0.02 | — | — | 0.02 | — | 0.02 | 0.02 |

TABLE 3-continued

| | | | | | | | | |
|---|---|---|---|---|---|---|---|---|
| Decomposition accelerator (parts by weight) | 0.10 | 0.13 | — | — | — | — | — | — |
| Extrusion and pelletizing | conducted | conducted | not conducted | not conducted | conducted | conducted | conducted | conducted |
| Appearance of resin composition | pellet | pellet | powder | powder | pellet | pellet | pellet | pellet |
| MI (g/10 min) | 960 | 1190 | 510 | 1290 | 512 | 512 | 512 | 790 |
| Tm(° C.) | 160 | 161 | 152 | 152 | 150 | 150 | 150 | 151 |
| Trc(° C.) | 119 | 118 | 109 | 110 | 108 | 108 | 108 | 109 |
| X.S (wt %) | 2.2 | 2.3 | 0.5 | 0.4 | 0.6 | 0.6 | 0.6 | 0.7 |
| MWD | 3.1 | 3.1 | 2.3 | 2.3 | 2.5 | 2.5 | 2.5 | 2.5 |
| OIT (minutes) | 9.7 | 8.4 | 1.6 | 1.7 | 27.2 | 25.2 | 29.3 | 26.4 |
| yellowing (Hr, 170° C.) | 0.5 | 0.5 | 5 | 5 | 8 | 7 | 8 | 8 |
| Fiber diameter (μm) | 1.2 | 1.0 | 1.4 | 1.0 | 1.4 | 1.4 | 1.4 | 1.2 |

| | Comparative Example | | | | | | |
|---|---|---|---|---|---|---|---|
| | 9 | 10 | 11 | 12 | 13 | 14 | 15 |
| Kind of homo polypropylene | Comparative Preparation Example 6 | Comparative Preparation Example 6 | Comparative Preparation Example 7 | Comparative Preparation Example 7 | Comparative Preparation Example 7 | Comparative Preparation Example 5 | Comparative Preparation Example 8 |
| antioxidant A (parts by weight) | — | — | 0.10 | — | — | — | — |
| antioxidant B (parts by weight) | 0.10 | — | — | 0.10 | — | — | — |
| antioxidant C (parts by weight) | — | 0.10 | — | — | 0.10 | — | 0.10 |
| antioxidant D (parts by weight) | — | — | — | — | — | 0.10 | — |
| lubricant (parts by weight) | — | 0.02 | 0.02 | — | 0.02 | 0.02 | 0.02 |
| Decomposition accelerator (parts by weight) | — | — | — | — | — | — | — |
| Extrusion and pelletizing | conducted | conducted | conducted | conducted | conducted | conducted | conducted |
| Appearance of resin composition | pellet | pellet | pellet | pellet | pellet | pellet | pellet |
| MI (g/10 min) | 790 | 790 | 1180 | 1180 | 1180 | 512 | 380 |
| Tm(° C.) | 151 | 151 | 151 | 151 | 151 | 150 | 156 |
| Trc(° C.) | 109 | 109 | 108 | 108 | 108 | 108 | 120 |
| X.S (wt %) | 0.7 | 0.7 | 0.6 | 0.6 | 0.6 | 0.6 | 0.6 |
| MWD | 2.5 | 2.5 | 2.6 | 2.6 | 2.6 | 2.5 | 2.3 |
| OIT (minutes) | 25.9 | 29.6 | 27.4 | 25.5 | 29.3 | 27.0 | 29.0 |
| yellowing (Hr, 170° C.) | 7 | 8 | 8 | 7 | 8 | 7 | 8 |
| Fiber diameter (μm) | 1.2 | 1.2 | 1.0 | 1.0 | 1.0 | 1.0 | 1.6 |

In Tables 2 and 3, materials used are as follows, and parts by weight is based on 100 parts by weight of homo polypropylene:

Antioxidant A: 1,3,5-tris(3,5-di-tert-butyl-4-hydroxybenzyl)-1,3,5-triazine-2,4,6-(1H,3H,5H)-trione (Irganox® 3114, BASF Corporation)

Antioxidant B: octadecyl-3-[3,5-di-tert-butyl-4-hydroxyphenyl]propionate (Irganox® 1076, BASF Corporation)

Antioxidant C: 1,3,5-tris(4-tert-butyl-3-hydroxy-2,6-dimethylbenzyl)-1,3,5-triazine-2,4,6-(1H,3H,5H)-trione (Cyanox® 1790, CYTEC Corporation)

Antioxidant D: Pentaerythritol tetrakis[3-[3,5-di-tert-butyl-4-hydroxyphenyl]propionate) (Irganox 1010®, BASF Corporation)

Lubricant: calcium stearate

Decomposition accelerator: Lupersol® (Wallace & Tieman, Inc.)

As the result of experiments, the polypropylene resin compositions of Examples 1~9 were pellet types, and exhibited high heat resistance of 8 hours or more, and excellent oxidation stability with OIT of 30 minutes or more.

The invention claimed is:

1. A pellet type polypropylene resin composition comprising:
   homo polypropylene having a melt index, measured under load of 2.16 kg at 230° C. according to ASTM D1238, of 400 g/10 min or more; and
   an antioxidant,
   wherein the pellet type polypropylene resin composition fulfills the following conditions a1) to a6):
   a1) melt index, measured under load of 2.16 kg at 230° C. according to ASTM D1238: 400 to 1500 g/10 min,
   a2) melting temperature: 154° C. to 170° C.,
   a3) recrystallization temperature: 112° C. or more,
   a4) xylene solubles: 1.0 wt % or less, based on a total weight of the pellet type polypropylene resin composition,
   a5) molecular weight distribution: less than 2.4, and
   a6) oxidation induction time, measured under conditions of 200°° C. and 50 ml/min oxygen according to ASTM D3985: 30 minutes or more,
   wherein the antioxidant comprises a phenol-based compound having an aliphatic hydrocarbon having a carbon number of 12 or more, or having a structure of 1,3,5-triazine-2,4,6-(1H,3H,5H)-trione.

2. The pellet type polypropylene resin composition according to claim 1, wherein the homo polypropylene further fulfills the following conditions b1) to b3):
   b1) melt index, measured under a load of 2.16 kg at 230° C. according to ASTM D1238: 500 to 1500 g/10 min,
   b2) xylene solubles: 0.1 to 1 wt %, based on a total weight of the homo polypropylene, and
   b3) molecular weight distribution: less than 2.4.

3. The pellet type polypropylene resin composition according to claim 1, wherein the antioxidant comprises octadecyl-3-,[5-di-tert-butyl-4-hydroxyphenyl] propionate, 1,3,5-tris (3,5-di-tert-butyl-4-hydroxybenzyl)-1,3,5-triazine-2,4,6-(1H,3H,5H)-trione, 1,3,5-tris(4-tert-butyl-3-hydroxy-2,6-dimethylbenzyl)-1,3,5-triazine-2,4,6-(1H,3H,5H)-trione or a mixture thereof.

4. The pellet type polypropylene resin composition according to claim 1, wherein the antioxidant is comprised in an amount of 0.01 to 1 part by weight, based on 100 parts by weight of the homo polypropylene.

5. The pellet type polypropylene resin composition according to claim 1, further comprising a lubricant in an amount of 0.01 to 0.05 parts by weight, based on 100 parts by weight of the homo polypropylene.

6. The pellet type polypropylene resin composition according to claim 5, wherein the lubricant comprises calcium stearate, aluminum para-tert-butyl benzoate, sodium benzoate, calcium benzoate, or a mixture thereof.

7. The pellet type polypropylene resin composition according to claim 1, further fulfilling one or more conditions of the following a1') to a6'):
   a1') melt index, measured under load of 2.16 kg at 230° C. according to ASTM D1238: 500 to 1500 g/10 min,
   a2') melting temperature: 155 to 170° C.,
   a3') recrystallization temperature: 120 to 130° C.,
   a4') xylene solubles: 0.1 to 0.5 wt %, based on the total weight of the pellet type polypropylene resin composition,
   a5') molecular weight distribution: 2 to 2.3, and
   a6') heat resistance measured by a time until yellowing at 170° C.: 8 to 15 hours.

8. A method for preparing the pellet type polypropylene resin composition of claim 1, comprising steps of:
   conducting polymerization of propylene monomers while introducing hydrogen gas, in the presence of a catalyst composition comprising a transition metal compound represented by Chemical Formula 1, to prepare the homo polypropylene; and
   mixing the homo polypropylene with the antioxidant to prepare a mixed composition, and then, extruding and pelletizing:
   wherein the antioxidant comprises a phenol-based compound having an aliphatic hydrocarbon having a carbon number of 12 or more, or having a structure of 1,3,5-triazine-2,4,6-(1H,3H,5H)-trione,

[Chemical Formula 1]

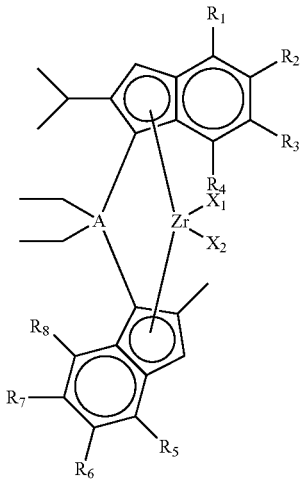

in the Chemical Formula 1,

A is carbon, silicon or germanium, $X_1$ and $X_2$ are each independently halogen, $R_1$ and $R_5$ are each independently $C_{6-20}$ aryl substituted with $C_{1-20}$ alkyl, $R_2$ to $R_4$, and $R_6$ to $R_8$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl.

9. The method for preparing the pellet type polypropylene resin composition according to claim 8, wherein
   A is silicon,
   $R_1$ and $R_5$ are each independently phenyl substituted with $C_{3-6}$ branched alkyl.

10. The method according to claim 8, wherein the transition metal compound is represented by Chemical Formula 1a:

[Chemical Formula 1a]

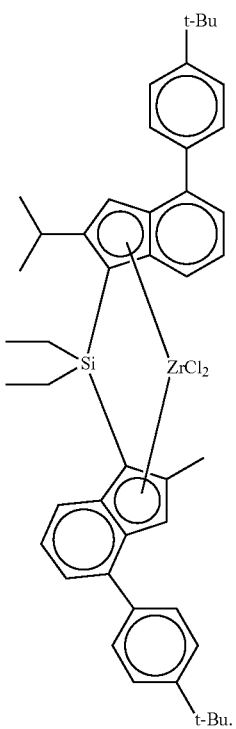

11. The method according to claim 8, wherein the catalyst composition further comprises a silica carrier and an alkylaluminoxane based cocatalyst.

12. The method according to claim 8, wherein the hydrogen gas is introduced in an amount of 500 to 1000 ppm, based on the total weight of the propylene monomers.

13. The method according to claim 8, further comprising a step of contacting and reacting the catalyst composition comprising the transition metal compound with the propylene monomers to progress prepolymerization before preparing the homo polypropylene.

14. The method according to claim 8, wherein a lubricant is further introduced in an amount of 0.01 to 0.05 parts by weight, based on 100 parts by weight of the homo polypropylene, when preparing the mixed composition.

15. The method according to claim 8, wherein the extruding and pelletizing are conducted at 150 to 250° C.

16. The method according to claim 8, wherein the extruding and pelletizing are conducted by a underwater pelletizing process.

17. The method according to claim 16, wherein the underwater pelletizing process is conducted at die temperature of 150 to 250° C., cooling water temperature of 40 to 80° C., and cutter rotation speed of 400 to 1,000 rpm.

18. A fiber comprising the pellet type polypropylene resin composition according to claim 1.

\* \* \* \* \*